W. D. STROUD,

Assignor to R. EMERSON & W. A. TALCOTT.

SEEDER AND CULTIVATOR COMBINED.

No. 10,166. Reissued July 18, 1882.

Attest.
Geo. A. Meyer
Jerome Finding

Inventor.
William D. Stroud
by Stern & Peck
his Attorneys

N. PETERS, Photo-Lithographer, Washington, D. C.

UNITED STATES PATENT OFFICE.

WILLIAM D. STROUD, OF OSHKOSH, WISCONSIN, ASSIGNOR TO RALPH EMERSON AND WILLIAM A. TALCOTT.

SEEDER AND CULTIVATOR COMBINED.

SPECIFICATION forming part of Reissued Letters Patent No. 10,166, dated July 18, 1882.

Original No. 101,178, dated March 22, 1870. Application for reissue filed April 14, 1882.

*To all whom it may concern:*

Be it known that I, WILLIAM D. STROUD, of the city of Oshkosh, in the county of Winnebago and State of Wisconsin, have invented certain new and useful Improvements in Seeders and Cultivators, of which the following is a specification.

The first part of my invention relates to the application of a horizontally-revolving seed-distributer provided with paddles to the bottom of the seed cups or hopper of a seeding-machine, the object of this part of my invention being to supply the seed or the material to be sown to the discharge-tubes with uniformity.

The second part of my invention relates to the combination of the parts of the seeding-machine and a set of cultivator-teeth arranged in such a manner that when the seed is supplied to the discharge-tubes by the horizontally-revolving seed-distributer and sown the cultivator-teeth will pass over the ground sown, the object of this part of my invention being to sow the seed broadcast and to harrow it in as it is sown.

Figure 1:
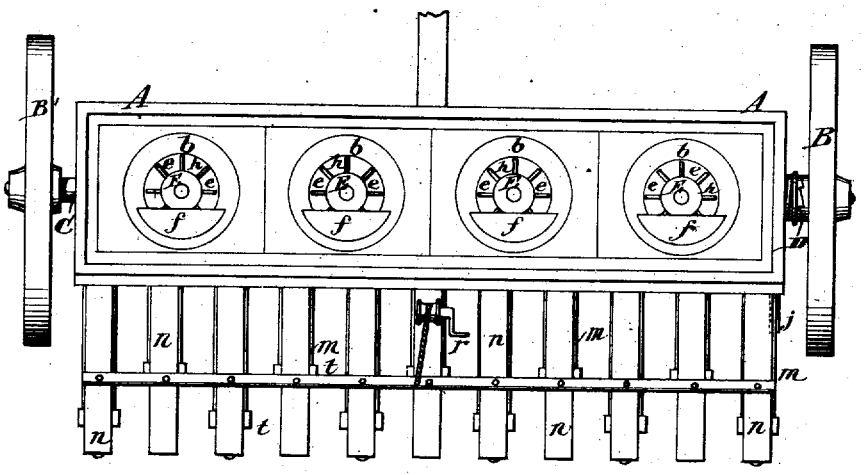
Figure 2:
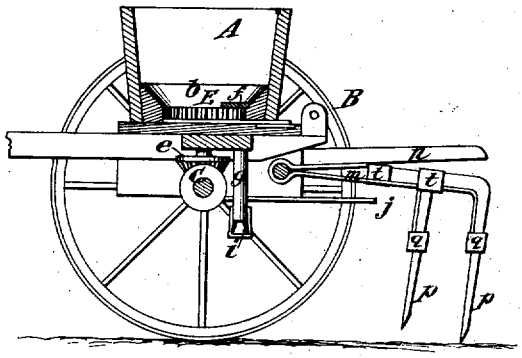
Figure 3:
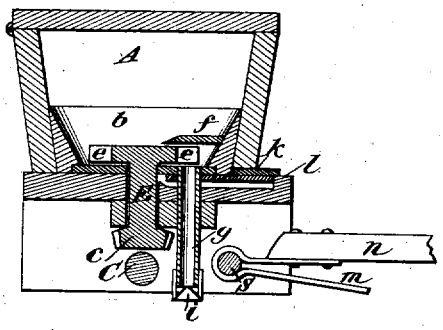
Figure 4:
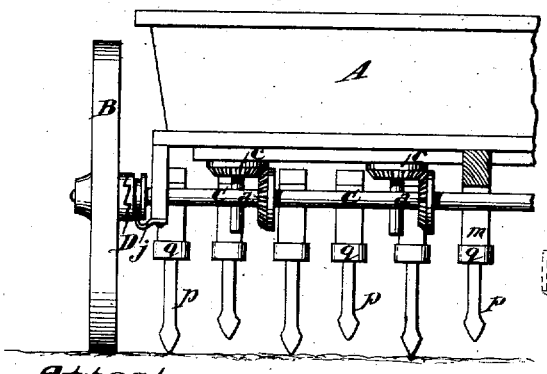
Figure 5:
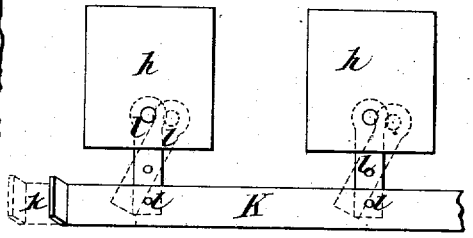

Figure 1 is a top view of the machine. Fig. 2 is a transverse section of the machine, showing a view of the revolving seed-distributer. Fig. 3 is a transverse section of the machine, showing a section of the seed-cup and revolving seed-distributer. Fig. 4 is a rear view of half of the machine. Fig. 5 is a top view of the metallic bottom of the seed-cups and the sliding gages for regulating the size of the openings of the discharge-tubes.

A is a seed-box of ordinary construction. B and B′ are supporting-wheels. B is also the driving-wheel. C is the axle and driving-shaft, provided with the beveled wheels *a*. D is the coupling attachment or clutch for engaging the driving-shaft with the wheel B. *b* represents the seed-cups, of any suitable construction. E represents the horizontally-revolving feed-distributers, having the paddles *e* and beveled wheels *c*. *f* represents the cut-off plates, placed in the seed-cups *b* directly over the opening of the discharge-tubes *g*. *h* is the metallic bottom of the seed-cups *b*. *i* is a scatterer. *j* is a lever for throwing the coupling D in and out of gear. *k* is a bar that connects the pivoted gages *l*. *m* is a spring-lag. *n* is a supplemental lag. *o* is a connecting-bar. *p* is a cultivator-tooth. *q* and *t* are collars used to connect the tooth *p* to the spring-lag *m*. *r* is a sheave with cord and crank for raising the cultivator-teeth from the ground. *s* is the bar or shaft to which the cultivator-teeth are attached.

The wheel B revolves upon the axle or driving-shaft C when the coupling D is out of gear. The coupling D is fastened to the driving-shaft C, so that it can be thrown in or out of gear by the lever *j*, and when the coupling D is in gear it is revolved by the wheel B and causes the shaft C to be revolved. The revolution of the shaft C communicates motion to the seed-distributers E through beveled wheels *a* and *c*. The paddles *e* carry the seed under the cut-off plates *f*, where it passes into the discharge-tubes *g*. As it passes out of the discharge-tubes *g* the scatterers *i* scatter it broadcast and the cultivator-teeth pass over and harrow it in. When one of the cultivator-teeth *p* strikes an object the spring-lag *m* permits it to rebound and clear the object without interfering with the working of the machine. By turning the crank of the sheave *r* the cord attached to the bar *o* raises the cultivator-teeth from the ground.

I claim as my invention—

1. In a seeding-machine, the combination of a horizontally-rotating toothed feed-wheel arranged in the bottom of the hopper, a discharge-orifice into which the material to be sown is conducted by the feed-wheel, and a cut-off plate or shield arranged over said orifice and the periphery of the feed-wheel, whereby uniformity in feeding is obtained and clogging prevented.

2. In a seeding-machine, a horizontally-rotating feed-wheel arranged in the bottom of the hopper and having a discharge-orifice arranged near its periphery, in combination with a pivoted gate or gage adapted to work across the throat of the orifice to regulate the quantity to be discharged.

3. The revolving seed-distributer E, having the paddles *e* and beveled wheels *c*, cut-off plate *f*, and seed-cup *b*, arranged relatively to one another and to the sliding gage *l*, connecting-bar *k*, discharge-tubes *g*, and driving-shaft C, substantially as and for the purposes hereinbefore specified.

4. The spring-lag *m*, supplemental lag *n*, cultivator-tooth *p*, and collars *q* and *t*, arranged relatively one to the other, substantially as and for the purposes hereinbefore specified.

5. The combination of the seed-box A, supporting and driving wheels B and B′, driving-shaft C, with beveled wheels *a*, coupling D, lever *j*, revolving seed-distributers E, having paddles *e* and beveled wheels *c*, cut-off plates *f*, seed-cups *b*, sliding gages *l*, bar *k*, discharge-tubes *g*, scatterers *i*, spring-lags *m*, supplemental lags *n*, cultivator-teeth *p*, collars *q* and *t*, connecting-bar *o*, bar *s*, and sheave *r*, with cord and crank, substantially as and for the purposes hereinbefore specified.

Witness my hand.

WILLIAM D. STROUD.

Witnesses:
S. G. BRONSON,
H. D. EASTMAN.